(12) United States Patent
Lin

(10) Patent No.: US 11,358,893 B2
(45) Date of Patent: Jun. 14, 2022

(54) POSITIVE POLYMER FECAL SLUDGE TREATMENT APPARATUS

(71) Applicant: Frank Lin, Staten Island, NY (US)

(72) Inventor: Yongzhu Lin, Fujian (CN)

(73) Assignee: Frank Lin, Staten Island, NY (US)

( * ) Notice: Subject to any disclaimer, the term of this patent is extended or adjusted under 35 U.S.C. 154(b) by 0 days.

(21) Appl. No.: 17/073,311

(22) Filed: Oct. 17, 2020

(65) Prior Publication Data

US 2022/0055934 A1 Feb. 24, 2022

(30) Foreign Application Priority Data

Aug. 21, 2020 (CN) .......................... 202010846527.1
Aug. 21, 2020 (CN) .......................... 202021757207.0

(51) Int. Cl.
*C02F 11/02* (2006.01)
*C02F 103/00* (2006.01)

(52) U.S. Cl.
CPC ........ *C02F 11/02* (2013.01); *C02F 2103/005* (2013.01); *C02F 2201/005* (2013.01); *C02F 2209/005* (2013.01)

(58) Field of Classification Search
CPC ......... C02F 11/02; C02F 11/00; C02F 11/125; C02F 2103/005; C02F 2201/005; C02F 2209/005; C02F 11/147; C02F 2303/24; B01F 13/10; B01F 13/1019; B01F 15/00; B01F 15/00025; B01F 33/812; B01F 35/1452
USPC .......................................................... 210/605
See application file for complete search history.

(56) References Cited

U.S. PATENT DOCUMENTS

| | | | |
|---|---|---|---|
| 2006/0060525 A1* | 3/2006 | Hoffland | B03D 1/14 210/603 |
| 2006/0138053 A1* | 6/2006 | Menke | C05F 3/00 210/703 |
| 2008/0314828 A1* | 12/2008 | Campbell | B09B 3/00 210/609 |
| 2015/0274556 A1* | 10/2015 | Church | C02F 11/125 210/710 |
| 2016/0096759 A1* | 4/2016 | Wright | C02F 11/04 210/614 |

* cited by examiner

*Primary Examiner* — Akash K Varma
(74) *Attorney, Agent, or Firm* — Magstone Law, LLP; Enshan Hong

(57) ABSTRACT

A positive polymer fecal sludge treatment apparatus comprising a trash separator, one end of which is connected with a sludge inlet, and the other end of which is connected with a twin-rotor vacuum water pump. A high-pressure transparent tube is disposed and connected, by a knife valve, between the trash separator and the twin-rotor vacuum water pump. One end of the knife valve is connected with a first material box and a second material box. A first chemical box and a second chemical box are disposed under the first material box and the second material box, and each of the first material box and the second material box is connected with the first chemical box and the second chemical box. The first and second material boxes have a larger volume than a conventional one and thus can store more material and also can perform chemical stirring reaction directly.

5 Claims, 4 Drawing Sheets

POSITIVE POLYMER FECAL SLUDGE TREATMENT APPARATUS

BACKGROUND OF THE INVENTION

1. Field of the Invention

The present invention belongs to the field of wastewater treatment technology and in particular relates to a positive polymer fecal sludge treatment apparatus.

2. Description of the Related Art

Fecal sludge refers to wastewater flushing feces of human during daily life, which is defined as domestic wastewater containing feces substances, for example, toilet wastewater and feces medium in toilets. The fecal sludge is a typical high-concentration organic wastewater for which the basic treatment task is to remove various organic matters therein. The current fecal sludge treatment method is a biological treatment method by which those organic matters in dissolved or colloidal state in the sludge are degraded by vital activities of microorganisms so as to purify the sludge. However, the apparatus of the method occupies a larger area, has a demanding temperature requirement, and takes a longer time of treatment with a lower treatment efficiency.

SUMMARY OF THE INVENTION

In order to improve the conventional fecal sludge treatment system, the present invention provides a positive polymer fecal sludge treatment apparatus with high efficiency and high speed.

To achieve this goal, this invention is implemented through following technical solution:

A positive polymer fecal sludge treatment apparatus includes a trash separator, one end of the trash separator is connected with a sludge inlet and the other end of the trash separator is connected with a twin-rotor vacuum water pump, a high-pressure transparent tube is disposed and connected, by a knife valve, between the trash separator and the twin-rotor vacuum water pump, a plurality of knife valves are disposed, one end of the knife valve is connected with a first material box and a second material box, a first chemical box and a second chemical box are disposed under the first material box and the second material box, each of the first material box and the second material box is connected with the first chemical box and the second chemical box, the first material box and the second material box are also connected with a mixing box, one end of the mixing box is connected with the first chemical box, and the other end of the mixing box is connected with a multi-disk screw press and a wastewater outlet, and one end of the multi-disk screw press is connected with a sludge outlet. The first material box and the second material box have a larger volume than a conventional one and thus can store more material and also can perform chemical stirring reaction directly. The multi-disk screw press has a longer length and a longer dewatering working stroke so that the fecal sludge can be treated cleaner and drier. When the mixing box runs, if the fecal sludge is not separated thoroughly, a second addition of chemical can be made for further solid-liquid separation.

Furthermore, at a side of the twin-rotor vacuum water pump is a numerical control operation box above which is an air compressor, the numerical control operation box includes an automatic control box, a pneumatic control box, a display screen, an indicator light, a rotary switch, an emergency stop button, a button switch, and a box door switch, two display screens are located respectively at the upper left of the automatic control box and the upper right of the pneumatic control box, a plurality of indicator lights and rotary switches are disposed, the indicator lights and the rotary switches are all located at the left side of the automatic control box, the emergency stop button is also at the left side of the automatic control box, a plurality of button switches are disposed, all of the button switches are at the right side of the pneumatic control box, and the box door switch is also located at the right side of the pneumatic control box. With the aid of the numerical control operation box, full-automatic operation can be realized, which is more advanced than a manual or semi-automatic operation.

Furthermore, the first chemical box includes a first left chemical box and a first right chemical box, the second chemical box includes a second left chemical box and a second right chemical box, the first left chemical box and the second left chemical box are both connected to the first material box, the first right chemical box and the second right chemical box are both connected to the second material box, and the mixing box includes a first mixing box and a second mixing box which are both are connected to the first left chemical box. With disposal of two material boxes and two chemical boxes, double charging of type C chemical and type M chemical can be realized. Further, in cooperation with the numerical control operation box, timed charging can be performed in a given amount. The second chemical box is a pre-reaction chemical box, and the first chemical box is a post-reaction chemical box.

Furthermore, one end of the twin-rotor vacuum water pump is connected with a three-way valve, an upper end of the three-way valve is connected to the trash separator and the second mixing box, a left end of the three-way valve is connected to the second left chemical box, the first left chemical box and the multi-disk screw press, a right end of the three-way valve is connected to the second right chemical box, the first right chemical box and the first mixing box, and a lower end of the three-way valve is thread-connected with a rotary valve. A manual valve or an automatic valve is disposed at the position connecting the three-way valve with various components. When a component needs washing, the washing can be performed by opening a corresponding manual valve or automatic valve.

Furthermore, the first material box, the second material box, the first left chemical box, the first right chemical box, the second left chemical box, the second right chemical box and the mixing box are provided with one or two mixers respectively, two mixers are disposed inside the first material box and further located at the left and right sides of the first material box respectively, two mixers are disposed inside the second material box and further located at the left and right sides of the second material box, the first left chemical box, the first right chemical box, the second left chemical box, the second right chemical box and the mixing box are provided with one mixer respectively, each of the mixers is connected to and controlled by the numerical control operation box, and an output shaft of each mixer is connected with a mixing shaft.

The present invention has the following beneficial effects: together with the two material boxes and two chemical boxes, the two large mixing boxes can work alternately to realize quick, high-efficiency and uninterrupted operation. The two chemical boxes included in each of the chemical boxes of different models can work alternately and uninterruptedly to realize double charging of type C chemical and type M chemical, thereby realizing faster chemical reaction and cleaner water discharge. Further, in cooperation with the numerical control operation box, timed charging can be performed in a given amount. The first material box and the second material box have a larger volume than a traditional one, can store more material and can perform chemical stirring reaction directly. The numerical control ball valve can control the discharge speed with each increase or decrease of 10%. The multi-disk screw press has a longer length and a longer dewatering working stroke so that the fecal sludge can be treated cleaner and drier. When the mixing box runs, if the fecal sludge is not separated thoroughly, a second addition of chemical can be made for further solid-liquid separation. By use of the numerical control operation box, full automatic operation can be realized, which is more advanced than a manual or semi-automatic operation. A manual valve is disposed at the position connecting the three-way valve with various components. When a component needs washing, the washing can be performed by opening a corresponding manual valve. Further, with the function of water suction and discharge, a large quantity of water can be sucked and discharged.

DETAILED DESCRIPTION OF PREFERRED EMBODIMENTS

By detailing the non-limiting examples of the present disclosure in combination with the drawings below, other features, the object and the advantages of the present disclosure will become more apparent.

Figure 1:
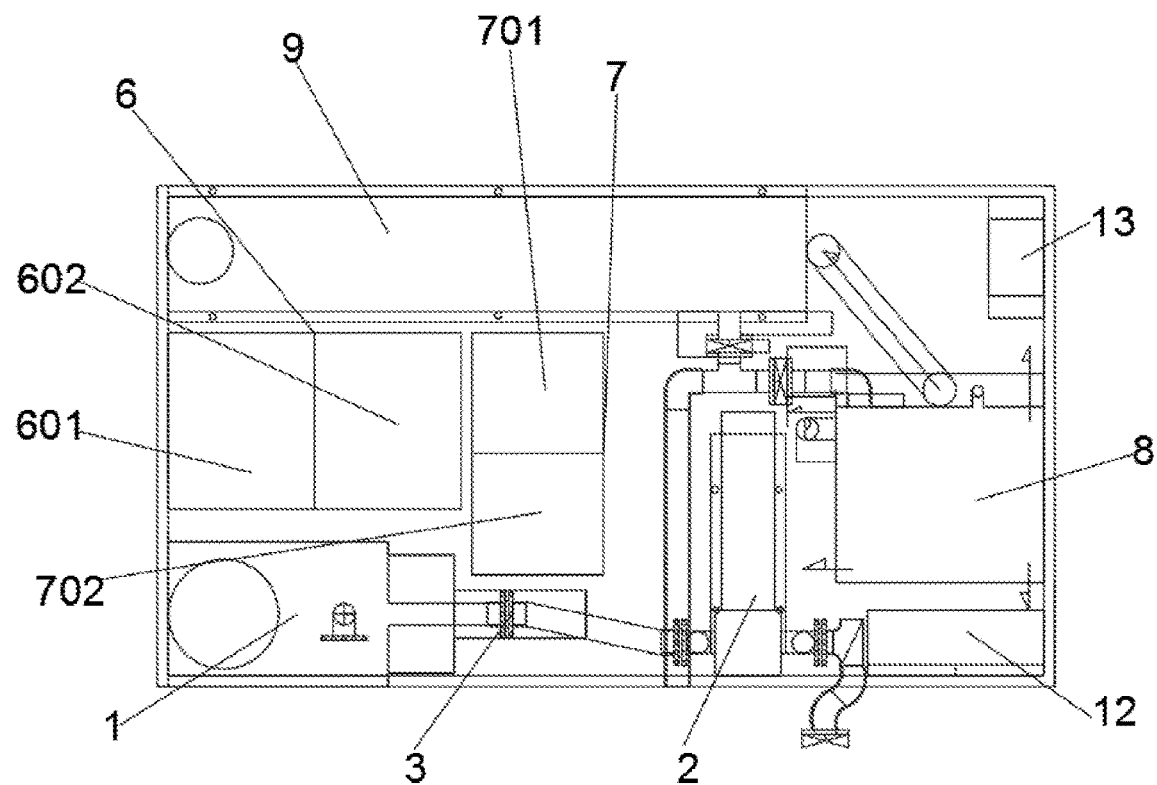
FIG. 1 is a structural schematic diagram of one side of a positive polymer fecal sludge treatment apparatus according to one or more examples of the present disclosure.
Figure 2:
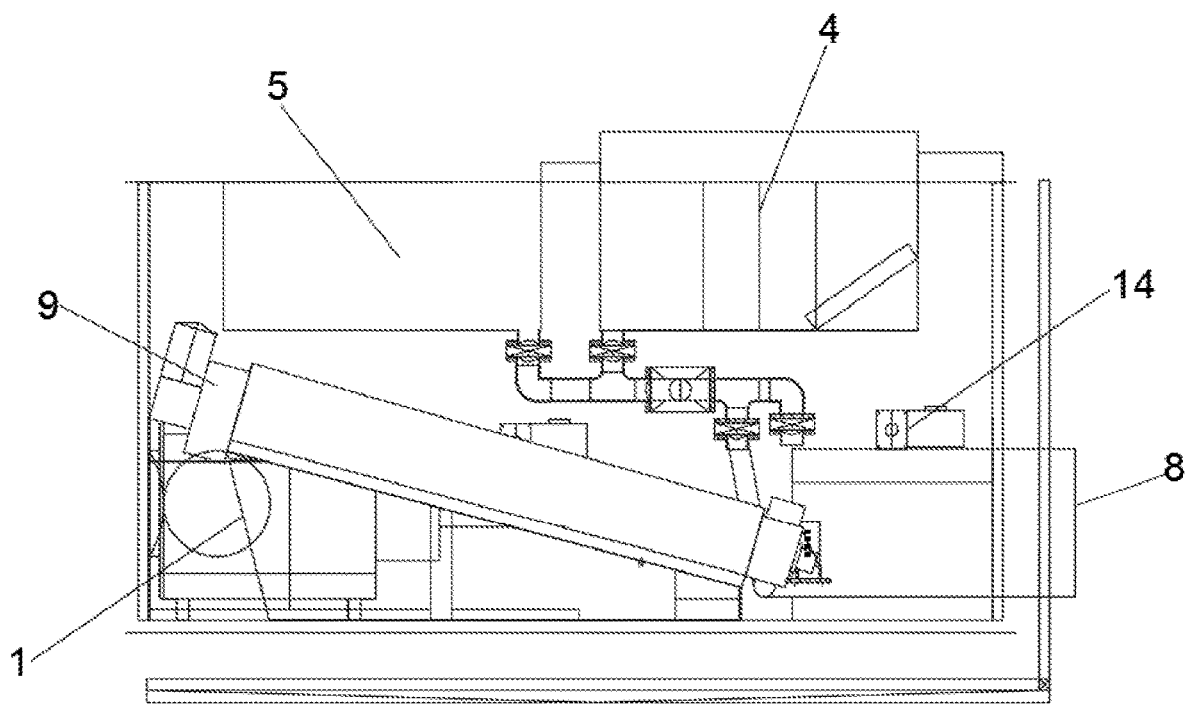
FIG. 2 is a structural schematic diagram of another side of a positive polymer fecal sludge treatment apparatus according to one or more examples of the present disclosure.
Figure 3:
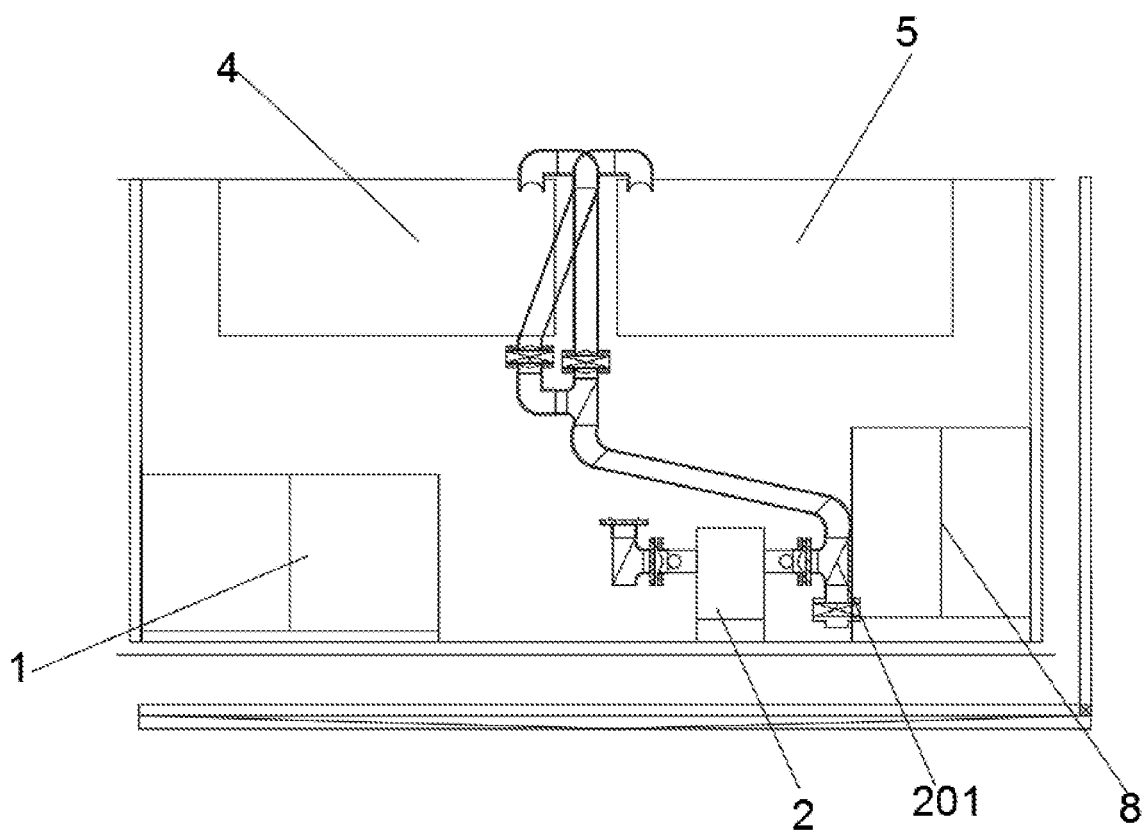
FIG. 3 is schematic diagram of a partial structure of a positive polymer fecal sludge treatment apparatus according to one or more examples of the present disclosure.
Figure 4:
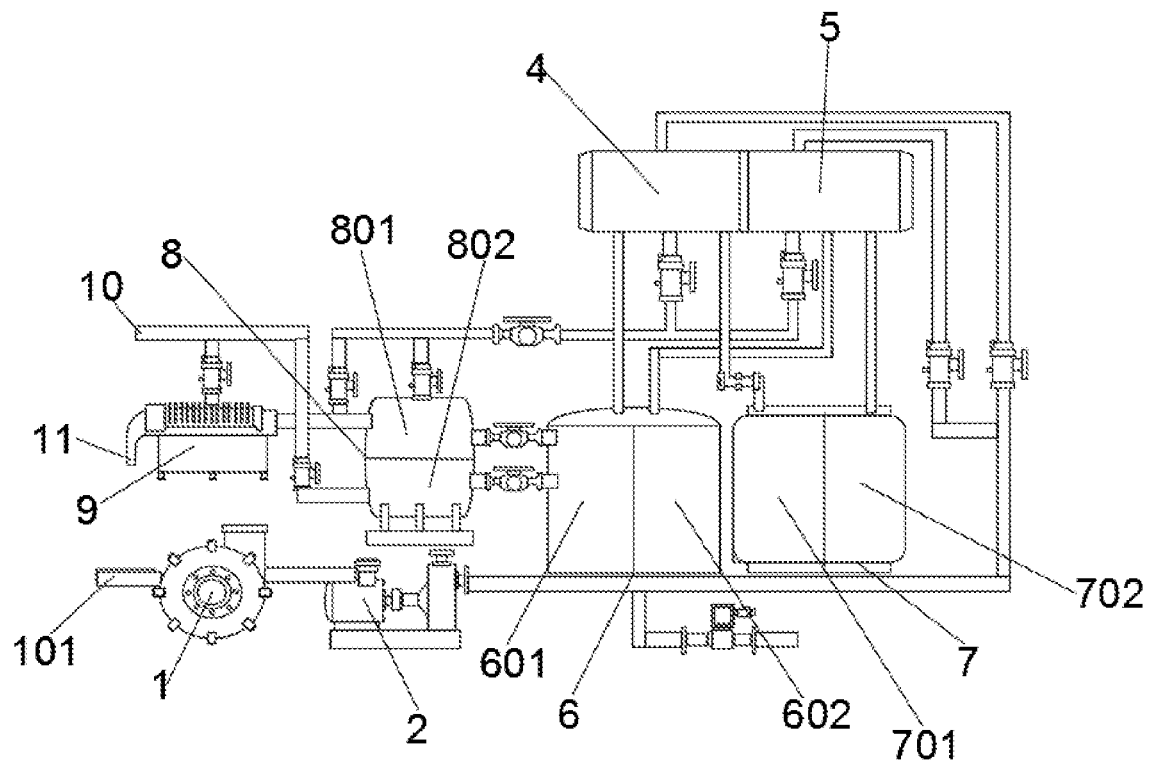
FIG. 4 is a structural schematic diagram of a working principle of a positive polymer fecal sludge treatment apparatus according to one or more examples of the present disclosure.
Figure 5:
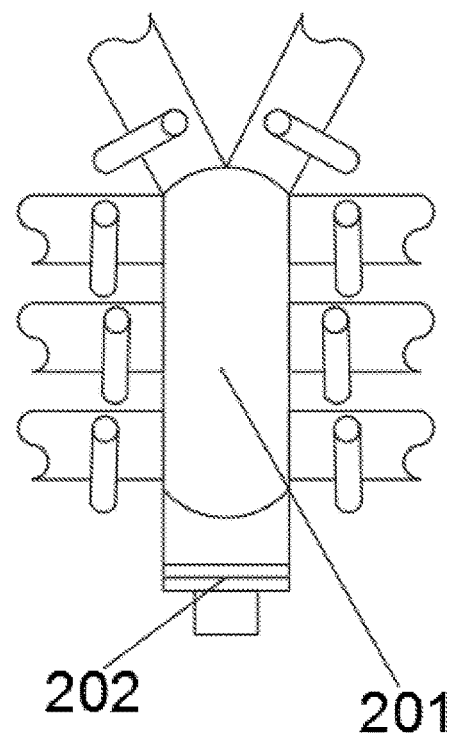
FIG. 5 is a structural schematic diagram of a three-way valve of a positive polymer fecal sludge treatment apparatus according to one or more examples of the present disclosure.
Figure 6:
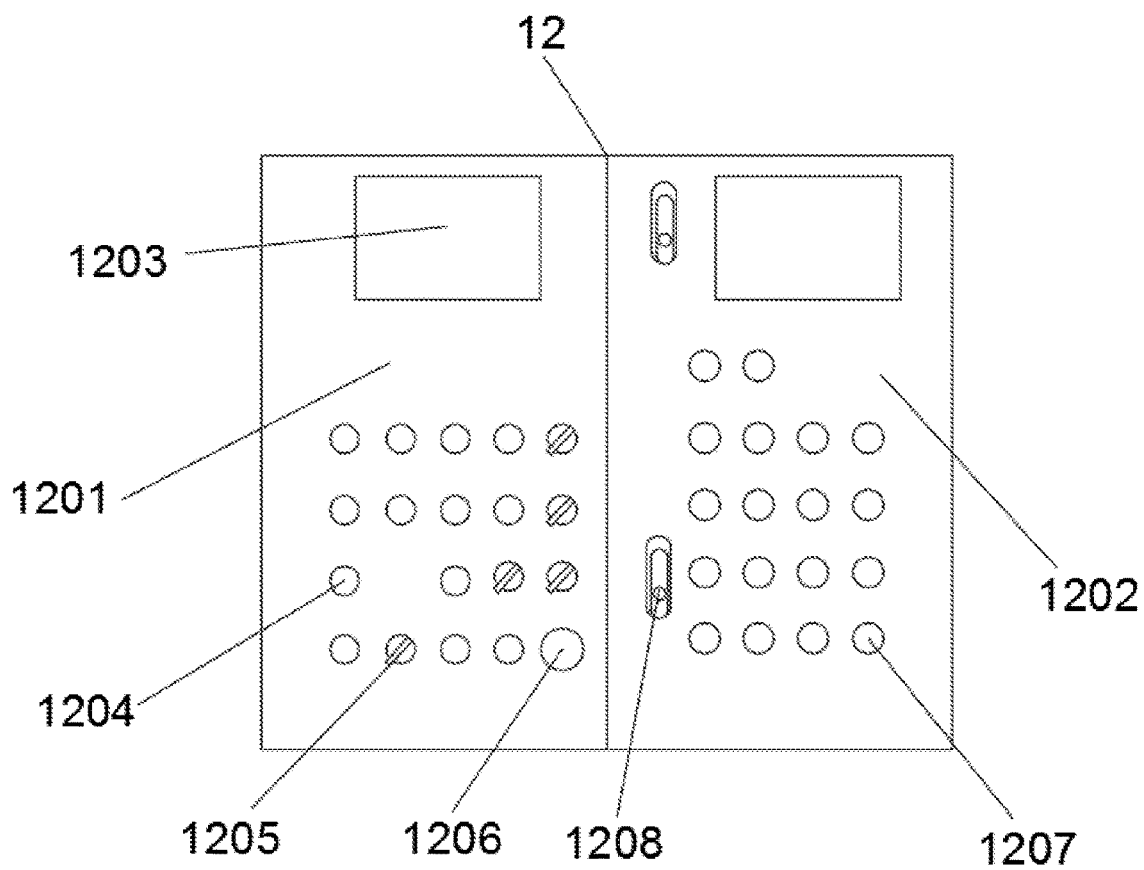
FIG. 6 is a structural schematic diagram of a numerical control operation box of a positive polymer fecal sludge treatment apparatus according to one or more examples of the present disclosure.
Figure 7:
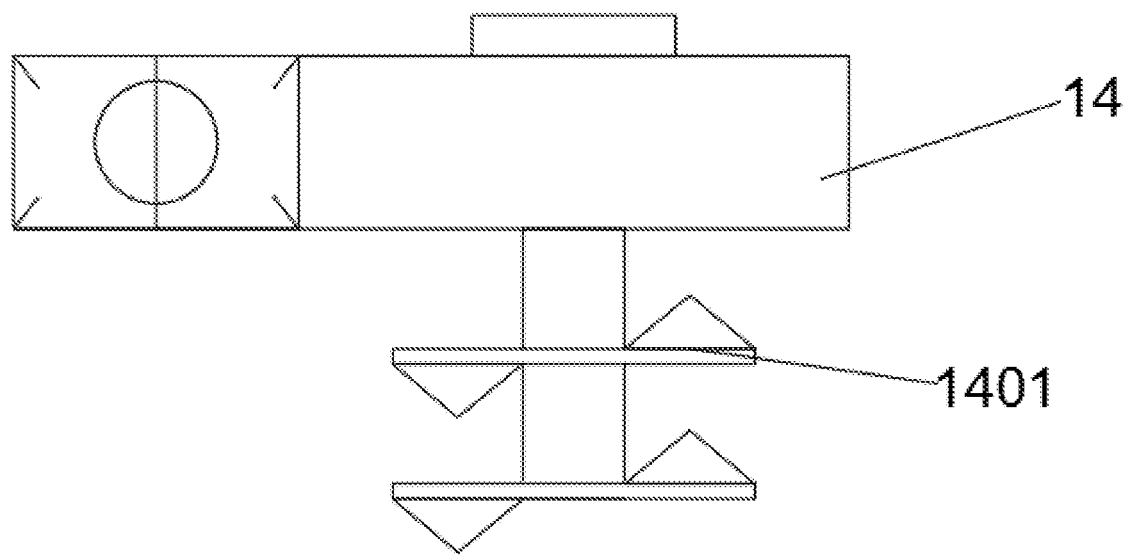
FIG. 7 is a schematic diagram of a mixing mechanism of a numerical control operation box of a positive polymer fecal sludge treatment apparatus according to one or more examples of the present disclosure.

Numerals of drawings in FIGS. 1-7 are described as follows: trash separator 1, twin-rotor vacuum water pump 2, high-pressure transparent tube 3, first material box 4, second material box 5, first chemical box 6, second chemical box 7, mixing box 8, multi-disk screw press 9, wastewater outlet 10, sludge outlet 11, numerical control operation box 12, air compressor 13, mixer 14, sludge inlet 101, three-way valve 201, rotary valve 202, first left chemical box 601, first right chemical box 602, second left chemical box 701, second right chemical box 702, first mixing box 801, second mixing box 802, automatic control box 1201, pneumatic control box 1202, display screen 1203, indicator light 1204, rotary switch 1205, emergency stop button 1206, button switch 1207, box door switch 1208, mixing shaft 1401.

As shown in FIGS. 1-7, the present application provides a positive polymer fecal sludge treatment apparatus including a trash separator 1. One end of the trash separator 1 is connected with a sludge inlet 101 and the other end of the trash separator 1 is connected with a twin-rotor vacuum water pump 2, a high-pressure transparent tube 3 is disposed and connected, by a knife valve, between the trash separator 1 and the twin-rotor vacuum water pump 2, a plurality of knife valves are disposed, one end of the knife valve is connected with a first material box 4 and a second material box 5, a first chemical box 6 and a second chemical box 7 are disposed under the first material box 4 and the second material box 5, each of the first material box 4 and the second material box 5 is connected with the first chemical box 6 and the second chemical box 7, the first material box 4 and the second material box 5 are also connected with a mixing box 8, one end of the mixing box 8 is connected with the first chemical box 6, and the other end of the mixing box 8 is connected with a multi-disk screw press 9 and a wastewater outlet 10, and one end of the multi-disk screw press is connected with a sludge outlet 11. At a side of the twin-rotor vacuum water pump 2 is a numerical control operation box 12 above which is an air compressor 13, the numerical control operation box 12 includes an automatic control box 1201, a pneumatic control box 1202, a display screen 1203, an indicator light 1204, a rotary switch 1205, an emergency stop button 1206, a button switch 1207, and a box door switch 1208, two display screens are located respectively at the upper left of the automatic control box 1201 and the upper right of the pneumatic control box 1202, a plurality of indicator lights 1204 and rotary switches 1205 are disposed, the indicator lights 1204 and the rotary switches 1205 are all located at the left side of the automatic control box 1201, the emergency stop button 1206 is also at the left side of the automatic control box 1201, a plurality of button switches 1207 are disposed, all of the button switches 1207 are at the right side of the pneumatic control box 1202, and the box door switch 1208 is also located at the right side of the pneumatic control box 1202. The first chemical box 6 includes a first left chemical box 601 and a first right chemical box 602, the second chemical box 7 includes a second left chemical box 701 and a second right chemical box 702, the first left chemical box 601 and the second left chemical box 701 are both connected to the first material box 4, the first right chemical box 602 and the second right chemical box 702 are both connected to the second material box 5, and the mixing box includes a first mixing box 801 and a second mixing box 802 which are both are connected to the first left chemical box 601. One end of the twin-rotor vacuum water pump 2 is connected with a three-way valve 201, an upper end of the three-way valve 201 is connected to the trash separator 1 and the second mixing box 802, a left end of the three-way valve 201 is connected to the second left chemical box 701, the first left chemical box 601 and the multi-disk screw press 9, a right end of the three-way valve 201 is connected to the second right chemical box 702, the first right chemical box 602 and the first mixing box 801, and a lower end of the three-way valve 201 is thread-connected with a rotary valve 202. The first material box 4, the second material box 5, the first left chemical box 601, the first right chemical box 602, the second left chemical box 701, the second right chemical box 702 and the mixing box 8 are provided with one or two mixers 14 respectively, two mixers 14 are disposed inside the first material box 4 and further located at the left and right sides of the first material box 4 respectively, two mixers are disposed inside the second material box 5 and further located at the left and right sides of the second material box 5, the first left chemical box 601, the first right chemical box 602, the second left chemical box 701, the second right chemical box 702 and the mixing box 8 are provided with one mixer 14 respectively, each of the mixers is connected to and controlled by the numerical control operation box 14, and an output shaft of each mixer is connected with a mixing shaft 1401.

For example, the apparatus of the present application may be moved to a desired position and then powered on with a vehicle-mounted power generator or an external power supply system to ensure the apparatus can be run as expected. The fecal sludge is sucked through the sludge inlet 101 into the trash separator 1 which may filter out un-decomposed wastes such as condoms, and then delivered to the first material box 4 and the second material box 5 which are charged with chemicals by the first chemical box 6 and the second chemical box 7, where the first chemical box 6 holds type M chemical and the second chemical box 7 holds type C chemical. The first chemical box 6 is a post-reaction chemical box and the second chemical box 7 is a pre-reaction chemical box. With the use of the polymer chemicals, the molecular number is larger. Next, the fecal sludge and the chemicals are mixed in the mixing box 8, and then separated, through the multi-disk screw press 9, into sludge and water which are finally discharged through the wastewater outlet 10 and the sludge outlet 11 respectively. When a component needs washing, the rotary valve 202 may be opened to connect with the external water source and then a corresponding manual valve or automatic valve is opened to perform washing.

The above descriptions are made to the basic principle, major features and advantages of the present invention. Persons skilled in the art may understand that the present invention is not limited to the details of the above examples and the present invention may be implemented in other forms without departing from the spirit or basic features of the present disclosure. Thus, the examples above shall be regarded as exemplary and non-limiting. The scope of protection of the present disclosure shall be defined by the appended claims rather than the above descriptions. Therefore, it is intended to encompass all changes within the meaning and scope of the equivalent elements of the claims into the present disclosure. Further, numerals of the drawings in the claims shall not be deemed as limiting of the claims.

Further, it is understood that although the specification is described in accordance with the examples, each example contains one independent technical solution only for the purpose of clarity. Those skilled in the art shall take the specification as a whole and may obtain other embodiments, ways, or modes by proper combinations of the technical solutions of different examples.

I claim:

1. A positive polymer fecal sludge treatment apparatus, wherein the positive polymer fecal sludge treatment apparatus comprises a trash separator, which is connected with a sludge inlet at a first end of the trash separator and a twin-rotor vacuum water pump at a second end of the trash separator; wherein a transparent tube is disposed and connected, through at least one knife valve, between the trash separator and the twin-rotor vacuum water pump; wherein one end of the at least one knife valve is connected with a first material box and a second material box; wherein a first chemical box and a second chemical box are disposed under the first material box and the second material box respectively; wherein each of the first material box and the second material box is connected with the first chemical box and the second chemical box respectively; wherein the first material box and the second material box are further connected with a mixing box; wherein one end of the mixing box is connected to the first chemical box and another end of the mixing box is connected to a multi-disk screw press and a wastewater outlet; and wherein the multi-disk screw press is connected to a sludge outlet.

2. The positive polymer fecal sludge treatment apparatus according to claim 1, wherein at a side of the twin-rotor vacuum water pump is a numerical control operation box above which is an air compressor; wherein the numerical control operation box comprises an automatic control box, a pneumatic control box, two display screens, a plurality of indicator lights, a plurality of rotary switches, an emergency stop button, a plurality of button switches, and a box door switch; wherein the two display screens are located respectively at an upper left of the automatic control box and an upper right of the pneumatic control box; wherein the plurality of indicator lights and the plurality of rotary switches are all located at a left side of the automatic control box; wherein the emergency stop button is also at the left side of the automatic control box; wherein the plurality of button switches are disposed at a right side of the pneumatic control box; and wherein the box door switch is also located at the right side of the pneumatic control box.

3. The positive polymer fecal sludge treatment apparatus according to claim 2, wherein the first chemical box comprises a first left chemical box and a first right chemical box, the second chemical box comprises a second left chemical box and a second right chemical box, the first left chemical box and the second left chemical box are both connected to the first material box, the first right chemical box and the second right chemical box are both connected to the second material box, the mixing box comprises a first mixing box and a second mixing box which are both connected to the first left chemical box.

4. The positive polymer fecal sludge treatment apparatus according to claim 3, wherein one end of the twin-rotor vacuum water pump is connected with a three-way valve, an upper end of the three-way valve is connected to the trash separator and the second mixing box, a left end of the three-way valve is connected to the second left chemical box, the first left chemical box and the multi-disk screw press, a right end of the three-way valve is connected to the second right chemical box, the first right chemical box and the first mixing box, and a lower end of the three-way valve is thread-connected with a rotary valve.

5. The positive polymer fecal sludge treatment apparatus according to claim 1, wherein the at least one knife valve is a plurality of knife valves.

\* \* \* \* \*